(12) United States Patent
Mizoguchi

(10) Patent No.: US 9,258,381 B2
(45) Date of Patent: Feb. 9, 2016

(54) INFORMATION PROCESSING APPARATUS, INFORMATION PROCESSING METHOD AND STORAGE MEDIUM STORING PROGRAM

(75) Inventor: Shigeru Mizoguchi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 280 days.

(21) Appl. No.: 13/532,443

(22) Filed: Jun. 25, 2012

(65) Prior Publication Data

US 2013/0024570 A1    Jan. 24, 2013

(30) Foreign Application Priority Data

Jul. 22, 2011 (JP) ................................. 2011-161367

(51) Int. Cl.
*G06F 15/173* (2006.01)
*H04L 29/08* (2006.01)

(52) U.S. Cl.
CPC ...... *H04L 67/2819* (2013.01); *H04L 29/08072* (2013.01); *H04L 67/02* (2013.01); *H04L 67/145* (2013.01)

(58) Field of Classification Search
CPC ....................... H04L 29/08072; H04W 76/022
USPC .................................. 709/203, 220, 224, 228
See application file for complete search history.

(56) References Cited

U.S. PATENT DOCUMENTS

| | | | |
|---|---|---|---|
| 6,717,915 B1 | 4/2004 | Liao et al. ...................... | 370/252 |
| 6,831,908 B2 | 12/2004 | Kikuchi ......................... | 370/338 |
| 8,294,927 B2 * | 10/2012 | Kunori ............... | H04N 1/00127 358/1.1 |
| 8,601,149 B2 * | 12/2013 | Ando et al. ...... | G11B 20/00086 709/231 |
| 2002/0122394 A1 * | 9/2002 | Whitmore et al. ............. | 370/328 |
| 2004/0249921 A1 | 12/2004 | Yamamoto .................... | 709/223 |
| 2004/0264402 A9 * | 12/2004 | Whitmore et al. ............. | 370/328 |
| 2006/0023676 A1 * | 2/2006 | Whitmore et al. ............. | 370/338 |
| 2006/0050630 A1 | 3/2006 | Kobayashi et al. ........... | 370/216 |
| 2010/0205279 A1 | 8/2010 | Takakura ...................... | 709/219 |
| 2013/0022033 A1 * | 1/2013 | Shi ................................ | 370/338 |

FOREIGN PATENT DOCUMENTS

| | | | |
|---|---|---|---|
| JP | 63-299631 | 12/1988 | ............. H04L 11/20 |
| JP | 2000-115196 | 4/2000 | ............... H04B 7/26 |
| JP | 2001-197124 A | 7/2001 | |

(Continued)

OTHER PUBLICATIONS

JP Application No. 2011-161367—Office Action dated Apr. 17, 2015.

(Continued)

*Primary Examiner* — Khanh Dinh
(74) *Attorney, Agent, or Firm* — Fitzpatrick, Cella, Harper & Scinto

(57) ABSTRACT

An information processing apparatus accesses to each of a plurality of access destinations via communications between the information processing apparatus and the server. And the apparatus decides a time-out time corresponding to each of the plurality of access destinations based on a communication count, with the server, for access to each of the plurality of access destinations. When accessing to an access destination of the plurality of access destinations via the communication with the server, the apparatus controls the communication to reach a time-out according to the time-out time which is decided and corresponds to the access destination.

14 Claims, 15 Drawing Sheets

(56) References Cited

FOREIGN PATENT DOCUMENTS

| | | | | |
|---|---|---|---|---|
| JP | 2004-310298 A | 11/2004 | .............. | G06F 13/00 |
| JP | 2006-079355 A | 3/2006 | .............. | G06F 13/10 |
| JP | 2010-187217 | 8/2010 | ............. | H04N 7/173 |

OTHER PUBLICATIONS

Jp Application No. 2011-161367 — Office Action dated Nov. 24, 2015.

* cited by examiner

F I G. 4
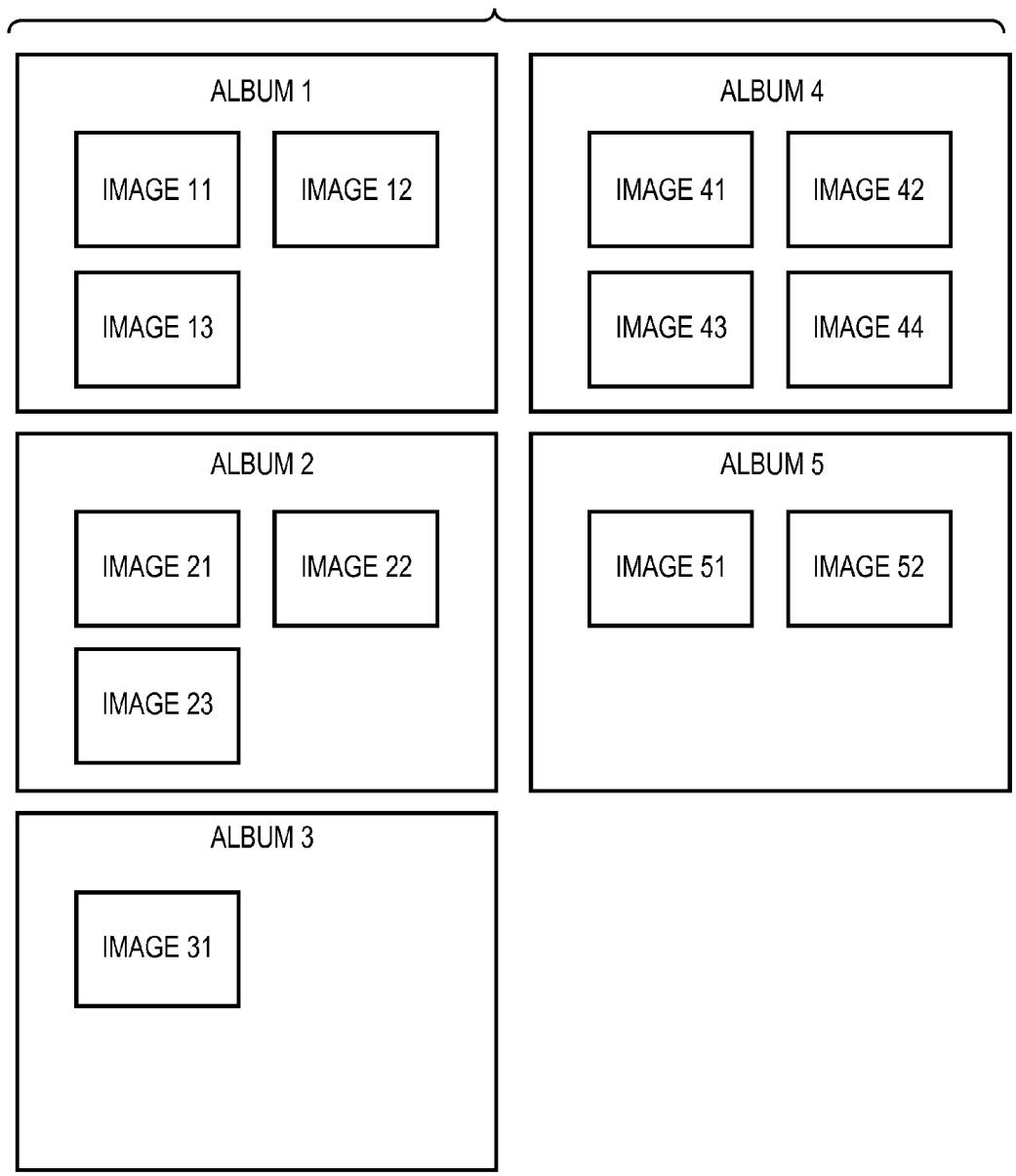

F I G. 5

```
<?xml version='1.0' encoding='UTF-8' ?>
<feed xmlns='http://www.w3.org/2005/Atom' xmlns:photo='http://schemas.A.com>
<totalResults>10</totalResults>
<user>annkodaisuki</user>
<maxPhotosPerAlbum>1000</maxPhotosPerAlbum>

<entry>
<published>2009-12-02T08:00:00.000Z</published>
<id>54105012691627471169</id>
<media:content url='http://lh3.A.com/_h3Nnl4upTHI/SxX2PP0-
5SE/AAAAAAAABDY/dsmG_pKdi2Q/Sizetest.jpg' type='image/jpeg' medium='image'/>
<media:thumbnail url='http://lh3.A.com/_h3Nnl4upTHI/SxX2PP0-
5SE/AAAAAAAABDY/dsmG_pKdi2Q/s160-c/Sizetest.jpg' height='160' width='160'/>
</entry>

<entry>
  :
</entry>

<entry>
  :
</entry>
```

F I G. 6

| SITE 103 | API-A1 | AUTHENTICATION |
|---|---|---|
| | API-A2 | ALL ALBUM INFORMATION ACQUISITION |
| | API-A3 | ALL IMAGE INFORMATION ACQUISITION |
| SITE 104 | API-B1 | AUTHENTICATION ACQUISITION DESTINATION CONFIRMATION |
| | API-B2 | AUTHENTICATION INFORMATION A ACQUISITION |
| | API-B3 | AUTHENTICATION INFORMATION B ACQUISITION |
| | API-B4 | AUTHENTICATION |
| | API-B5 | ALL ALBUM LIST ACQUISITION |
| | API-B6 | INDIVIDUAL ALBUM INFORMATION ACQUISITION |
| | API-B7 | INDIVIDUAL IMAGE INFORMATION ACQUISITION |
| SITE 105 | non | GET |

FIG. 7

| MFP REQUEST CONTENT | MFP API | CONNECTION SITE | RELAY SERVER API |
|---|---|---|---|
| CONDITION CHECK | API-R1 | ALL SITES | non |
| LOGIN AUTHENTICATION | API-R2 | SITE 103 | API-A1 |
| | | SITE 104 | API-B1 |
| | | | API-B2 |
| | | | API-B3 |
| | | | API-B4 |
| ALBUM LIST REQUEST | API-R3 | SITE 103 | API-A1 |
| | | | API-A2 |
| | | SITE 104 | API-B1 |
| | | | API-B2 |
| | | | API-B3 |
| | | | API-B4 |
| | | | API-B5 |
| | | | API-B6  *n TIMES |
| | | | API-B7  *n TIMES |
| IMAGE LIST REQUEST | API-R4 | SITE 103 | API-A1 |
| | | | API-A3 |
| | | SITE 104 | API-B1 |
| | | | API-B2 |
| | | | API-B3 |
| | | | API-B4 |
| | | | API-B6 |
| | | | API-B7 |

F I G. 12
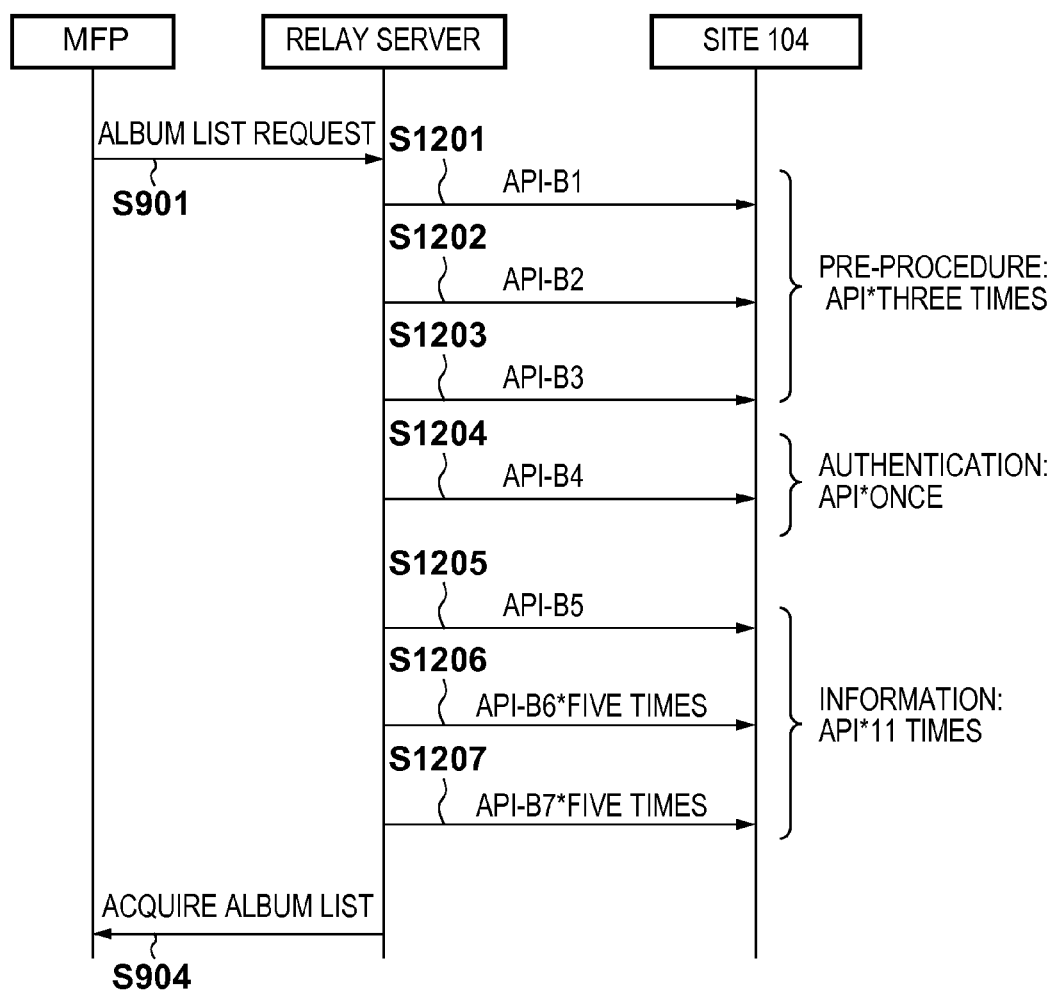

| CONDITION CHECK (M) | COMMUNICATION DETERMINATION VALUE |
|---|---|
| M ≤ REFERENCE VALUE*1.1 | — |
| REFERENCE*1.1 < M ≤ REFERENCE VALUE*1.2 | *1.1 |
| REFERENCE*1.2 < M ≤ REFERENCE VALUE*1.3 | *1.2 |
| REFERENCE*1.3 < M ≤ REFERENCE VALUE*1.4 | *1.3 |
| REFERENCE*1.n < M ≤REFERENCE VALUE*1.n+1 | *1.n |

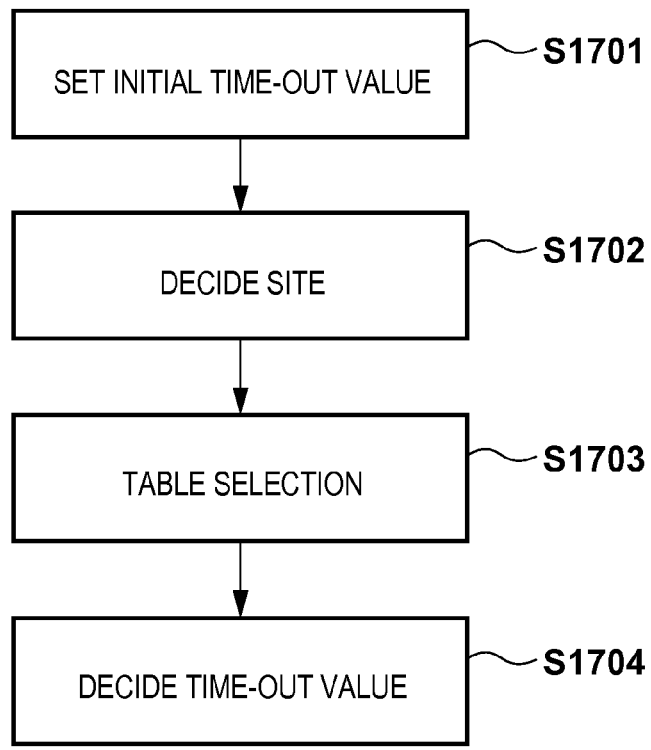

INFORMATION PROCESSING APPARATUS, INFORMATION PROCESSING METHOD AND STORAGE MEDIUM STORING PROGRAM

BACKGROUND OF THE INVENTION

1. Field of the Invention

The present invention relates to an information processing apparatus for acquiring data from a Web server, an information processing method, and a storage medium storing a program.

2. Description of the Related Art

Conventionally, an arrangement for acquiring information via a gateway/relay processing device upon acquiring information by establishing connection to a network such as the Internet is known (Japanese Patent Laid-Open No. 2001-197124). In such arrangement described in this literature, for example, the gateway/relay processing device makes packet communications with a cellular terminal in a packet cellular system, and makes packet communications with a terminal via a satellite in a satellite packet system. In this case, a relay processing device sets a time-out time in communications between the gateway/relay processing device and terminal depending on whether a terminal used in communications is the cellular terminal or the terminal which makes communications via the satellite.

When a client device uses Web services from Web servers, access destinations are different depending on Web services to be used by the user of the client device, and response times from the Web servers are different in some cases.

However, in such arrangement, a time-out time in communications between the Web server and client device is often set to be constant. In this case, the client device reaches a time-out in the constant time irrespective of Web services. For example, in the aforementioned related art, the server sets a time-out time according to a client device type, but access destinations to be accessed by the client device are not taken into consideration. For this reason, even if one client device uses various Web services, a time-out time between that client device and the server is unwantedly constant.

As described above, when a time-out time between the client device and server is constant, the time-out time has to be set under the assumption of a Web service that requires a longest response time from the Web server in consideration of, for example, ensured acquisition of information from the Web server by the client device. For this reason, even when a Web service used by the user requires a shorter response time from the Web server, the client device has to reach a time-out after waiting for a response from the server over more than an enough time.

SUMMARY OF THE INVENTION

An aspect of the present invention is to eliminate the above-mentioned problems with the conventional technology. The present invention provides an information processing apparatus which can control a communication to reach a time-out in an appropriate time depending on an access destination of the information processing apparatus, an information processing method, and a storage medium storing a program.

The present invention in its first aspect provides an information processing apparatus, which is configured to communicate with a server, comprising: an access unit configured to access to each of a plurality of access destinations via communications between the information processing apparatus and the server; a decision unit configured to decide a time-out time corresponding to each of the plurality of access destinations based on a communication count, with the server, for access by the access unit to each of the plurality of access destinations; and a control unit configured to, in a case where the access unit access to an access destination of the plurality of access destinations via the communication with the server, control the communication to reach a time-out according to the time-out time which is decided by the decision unit and corresponds to the access destination.

The present invention in its second aspect provides an information processing method for deciding a time-out time of a communication between an information processing apparatus and a server, the method comprising: accessing to each of a plurality of access destinations via communications between the information processing apparatus and the server; deciding a time-out time corresponding to each of the plurality of access destinations based on a communication count, with the server, for access by the access unit to each of the plurality of access destinations in the reception step; and in a case where the information processing apparatus accesses to an access destination of the plurality of access destinations via the communication with the server, controlling the communication to reach a time-out according to the time-out time which is decided in the decision step and corresponds to the access destination.

The present invention in its third aspect provides a computer-readable storage medium storing a program for controlling a computer, for the purpose of deciding a time-out time of a communication between an information processing apparatus and a server, to execute to: access to each of a plurality of access destinations via communications between the information processing apparatus and the server; decide a time-out time corresponding to each of the plurality of access destinations based on a communication count, with the server, for access by the access unit to each of the plurality of access destinations in the reception step; and in a case where the information processing apparatus accesses to an access destination of the plurality of access destinations via the communication with the server, control the communication to reach a time-out according to the time-out time, which is decided in the decision step and corresponds to the access destination.

According to the present invention, a communication can be controlled to reach a time-out in an appropriate time depending on an access destination of the information processing apparatus.

Further features of the present invention will become apparent from the following description of exemplary embodiments with reference to the attached drawings.

BRIEF DESCRIPTION OF THE DRAWINGS

FIG. 4 is a view showing an example of the data configuration registered in each site;

FIG. 5 shows a description example of an album list;

FIG. 6 is a table showing a list of APIs defined for respective sites;

FIG. 7 is a table showing correspondence between APIs between the MFP and relay server and those between the relay server and sites;

FIG. 12 is a chart for explaining an API use count for a site 104;

FIG. 17 is a flowchart showing the sequence of time-out value setting processing; and FIG. 18 is a table showing a list of time-out values corresponding to sites.

DESCRIPTION OF THE EMBODIMENTS

Figure 1:
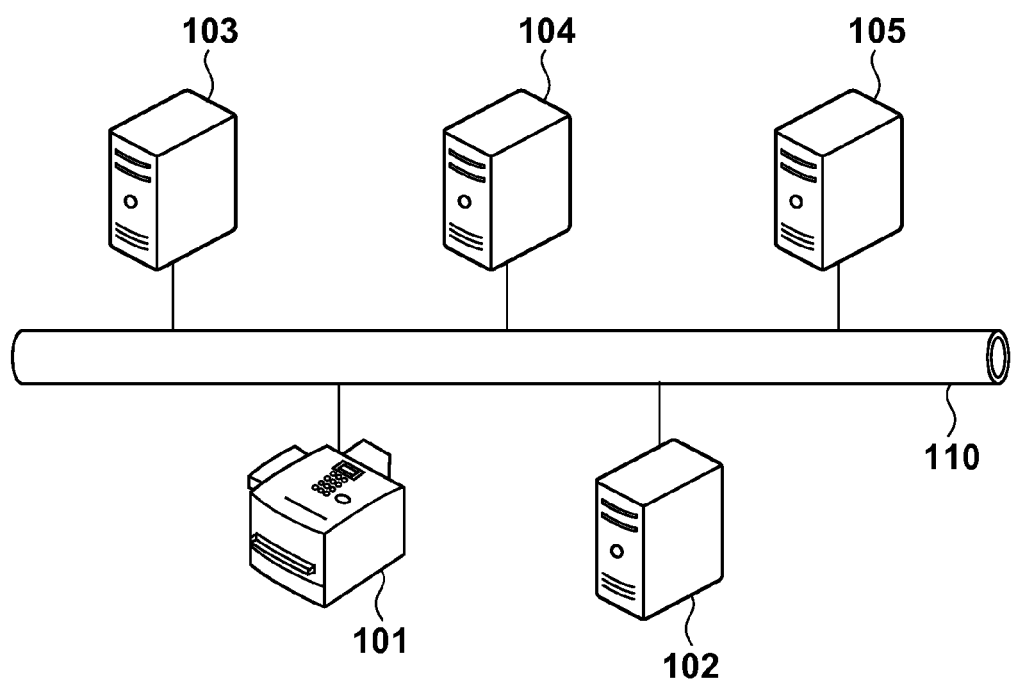
FIG. 1 is a diagram showing the arrangement of a Web service system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components throughout the drawings, and a description thereof will not be given.

[System Arrangement and Hardware Arrangement]

FIG. 1 is a diagram showing the arrangement of a Web service system according to the present invention. As shown in FIG. 1, an MFP (Multifunctional Apparatus) 101 as a client device is connected to Web servers 103, 104, and 105 via a network 110 such as the Internet. These servers provide, for example, a photo sharing site function to the client device, and the Web servers 103, 104, and 105 will also be referred to as sites 103, 104, and 105 hereinafter.

The MFP 101 exchanges data with the Web servers 103 to 105 via a relay server 102. In this arrangement, the relay server exchanges data with the Web servers using APIs which are respectively defined between itself and the corresponding Web servers. The relay server exchanges data with the MFP using APIs defined between itself and the MFP. That is, the relay server assumes a role of API conversion.

Furthermore, in this system, the MFP 101 accesses different Web servers depending on Web services used by the MFP. That is, the MFP 101 accesses one of the Web servers 103 to 105 depending on the type of a Web service (for example, a photo sharing site) used by the user of the MFP 101.

In this arrangement, the Web servers accessed by the MFP 101 often require different response times between themselves and the relay server 102. As one of causes of such different response times, API configurations of the respective Web servers are different. Therefore, when the user uses the plurality of Web services using the MFP 101, Web servers as access destinations are different depending on the Web services, and response times between the relay server 102 and Web servers are different depending on the Web servers as access destinations.

In this manner, since different response times are required depending on the Web servers as the access destinations of the MFP 101, a time-out time between the MFP 101 and relay server 102 has to be set depending on the access destinations. Hence, in this embodiment, when the MFP 101 accesses one of the Web servers 103 to 105 via the relay server 102, a time-out time between the MFP 101 and relay server 102 is set according to the Web server as the access destination. Details will be described later.

Note that the "photo sharing site function" is a function which stores images such as photos created by client devices in a server, and allows a plurality of client devices to access the images stored in the server. In this embodiment, the MFP 101 as the information processing apparatus can enjoy the photo sharing site functions of the respective sites by accessing the servers 103 to 105 via the relay server 102. For example, the MFP 101 acquires registration information such as a URL indicating a storage location of images from each of the sites 103 to 105 via the relay server 102, and accesses the server according to the acquired URL, thus displaying album and image selection screens. Especially, the MFP 101 can display album and image selection screens on a display device by accessing the site without the intervention of any PC or the like. When the user selects a desired image to be printed on that selection screen, the MFP 101 can acquire image data to be printed from each site, and can print that image.

Figure 2:
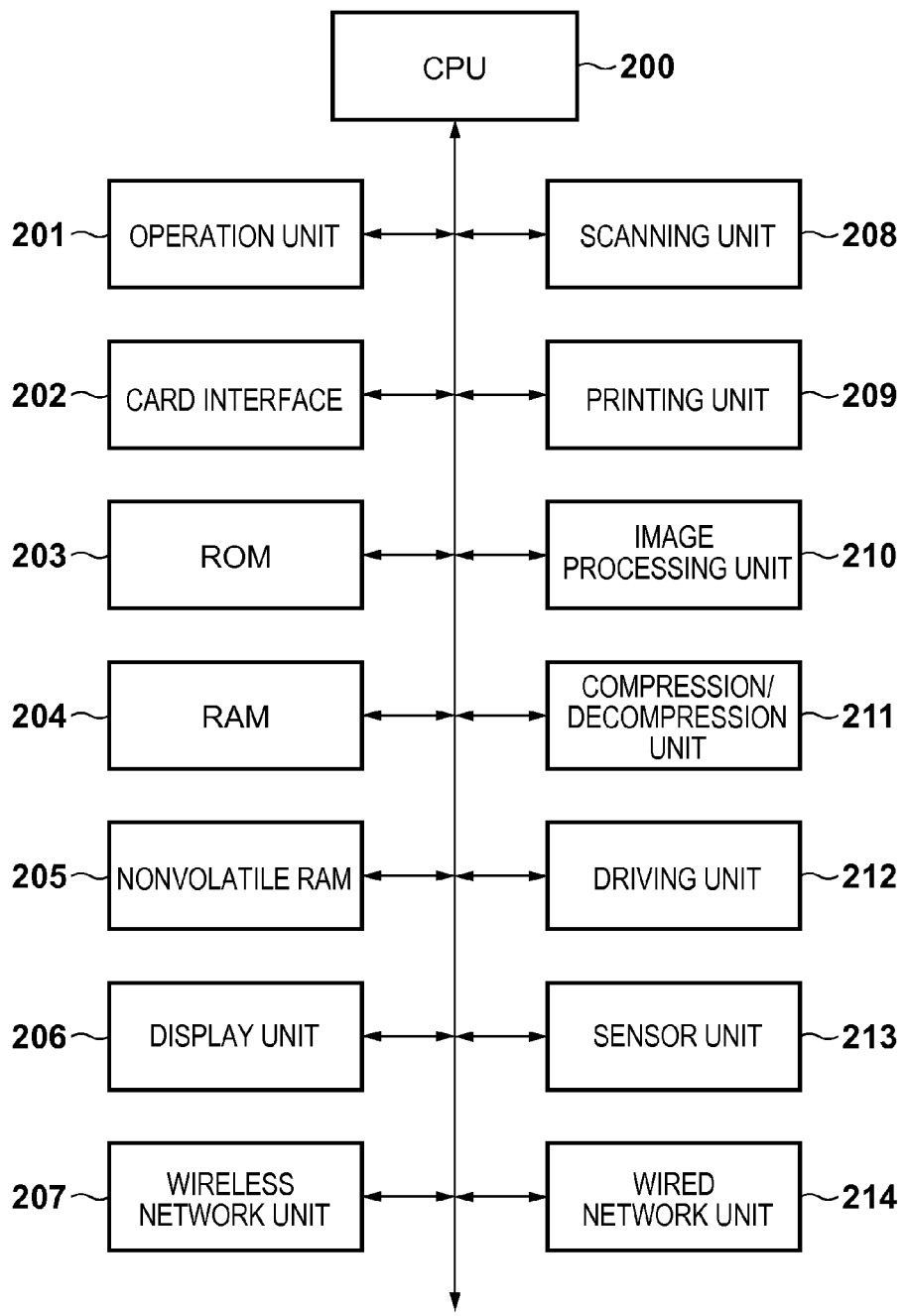
FIG. 2 is a block diagram showing the hardware arrangement of an MFP.

FIG. 2 is a block diagram showing the hardware arrangement of the MFP 101. The MFP 101 has an operation unit 201, card interface 202, scanning unit 208, and printing unit 209. Also, the MFP 101 has a CPU 200, ROM 203, RAM 204, nonvolatile RAM 205, display unit 206, image processing unit 210, compression/decompression unit 211, driving unit 212, and sensor unit 213. The CPU 200 controls the overall MFP 101, and executes a program stored in the ROM 203 according to, for example, a user instruction input via the operation unit 201. The ROM 203 stores a control instruction program and the like of the MFP 101. Furthermore, the MFP 101 has a wireless network unit 207 and a wired network unit 214. The wireless network unit 207 can wirelessly communicate with a wireless LAN access point which is compliant with, for example, the IEEE802.11a standards. The wired network unit 214 has an Ethernet® connector which can connect, for example, a 100Base-TX twisted pair cable.

Each of the relay server 102 and sites 103 to 105 shown in FIG. 1 adopts the arrangement of a general PC or the like. That is, each of the relay server 102 and sites 103 to 105 has a CPU, a ROM, a RAM, an HDD, a display unit such as a display, and an input unit such as a pointing device and keyboard as the general arrangement of the PC. For example, in each of these servers, the CPU expands a program loaded from the HDD, ROM, or the like on the RAM, and executes the expanded program. The HDD stores programs required to implement processes shown in various flowcharts and image data. The display displays a user interface and the like, and the user makes operations on the user interface using the pointing device, keyboard, or the like, thus inputting various instructions.

[Photo Sharing Site]

Prior to a description of the application configuration of the relay server 102, a photo sharing site function as one of Web services will be described below. The photo sharing site function provided as a Web service by each of the sites 103 to 105 is mainly premised on browsing using a browser on a PC. The user acquires an account, registers that account and a password as a set, and then uses the Web service.

FIG. 4 shows an example of the data configuration registered by each of the sites 103 to 105 in association with the photo sharing site function. Images registered in each of the sites 103 to 105 are combined as units called albums. For example, as shown in FIG. 4, five albums are registered in each site. Three images are registered in each of albums 1 and 2. One image is registered in album 3, four images are registered in album 4, and two images are registered in album 5. Furthermore, each album includes an album title, album registration date, and the like in addition to a thumbnail image which represents that album, and is displayed on a browser required to use the photo sharing site function. When the user selects one album from the displayed album list, he or she can browse one or more images registered in the selected album.

The aforementioned photo sharing site function can be used not only from a browser on a PC. For example, using the published APIs of the sites 103 to 105, an apparatus (MFP or the like) other than that which installs a browser can use Web services.

FIG. 5 shows a description example of the album list which is acquired by the relay server 102 from one of the sites 103 to 105 using an API. The album list is described using, for example, XML. As shown in FIG. 5, it can be confirmed from a tag "<totalResults>" that the number of albums is 10. As information of each album, an image URL, thumbnail image URL, ID, photographing date, and the like are described for each tag "<entry>".

The MFP 101 can support APIs of the relay server 102 by a network communication function. The MFP 101 does not directly issue any information request to APIs of the sites 103 to 105 upon acquisition of information from the sites 103 to 105. The MFP 101 issues an information request to the relay server 102 using HTTP POST communications with the relay server 102 using APIs defined between itself and the relay server 102.

The APIs between the relay server 102 and MFP 101 are defined, for example, as follows:

API-R1 (condition check): This API is used to confirm whether or not each site is connectable based on destination information and an IP address on the Internet of the MFP 101.

API-R2 (login authentication): This API is used to determine whether or not to allow authentication with each site.

API-R3 (album list request): This API is used to acquire a list of all albums.

API-R4 (image list request): This API is used to acquire a list of all images registered in each album.

The MFP 101 issues an information request to a site designated by the user (to the relay server 102 in practice, as described above), and receives an album list or image list according to the information request from the relay server 102. The MFP 101 can acquire a URL of display data from a corresponding part of the received list. The MFP 101 acquires authentication information and the list via the relay server 102, but it can directly receive image data from each site after a URL of image data or the like is acquired.

[Relay Server]

The relay server 102 assumes a role of the intervention using an API conversion function when the MFP 101 acquires information from the sites 103 to 105. The relay server 102 functions as a Web server in a relationship with the MFP 101, and functions as a Web client in a relationship with the respective sites 103 to 105.

Figure 3:
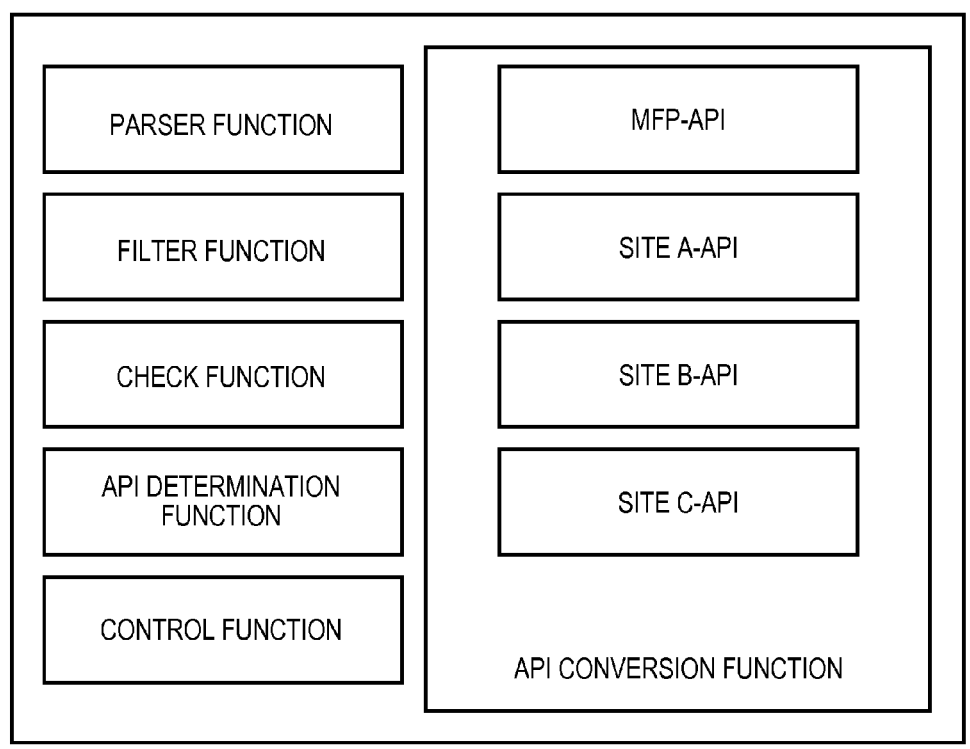
FIG. 3 is a diagram showing the application configuration of a relay server.

FIG. 3 shows the application configuration of the relay server 102. In this embodiment, a main function of the relay server 102 is an API conversion function. The relay server 102 defines an "MFP-API" between itself and the MFP 101. The relay server 102 API-converts the API configuration defined between itself and the MFP 101 into those ("site A-API", "site B-API", and "site C-API") defined between itself and the respective sites 103 to 105 as connection destinations.

FIG. 6 shows a list of APIs defined for the respective sites. When the MFP 101 acquires information from the respective sites, the relay server 102 has to use API configurations defined between itself and the respective sites. That is, even when the MFP 101 acquires identical information from the respective sites, different API configurations defined between the relay server 102 and the respective sites have to be used.

FIG. 7 shows correspondence between APIs (to be referred to as API-R hereinafter) defined between the MFP 101 and relay server 102 and those defined between the relay server 102 and the respective sites. As can be seen from FIG. 7, the number of APIs required to acquire data from each site changes depending on types of data requested by the MFP, and also changes even for the same type of data depending on the sites as connection destinations. For example, as can also be seen from FIG. 7, when the MFP 101 issues an information request by designating a certain site using an album list request API-R3, the types of APIs to be issued from the relay server 102 and the number of APIs to be issued change depending on the site designated by the user. Details will be described later.

Respective functions of the relay server 102 will be described below with reference to FIG. 3. The relay server 102 has the following functions. Note that in the relay server 102, programs corresponding to these functions are stored in the ROM, and the respective functions shown in FIG. 3 can be implemented when the CPU of the relay server 102 executes the programs stored in the ROM.

Parser function: This function parses, using a parser, an XML list from each site, as shown in FIG. 5.

Filter function: This function deletes data other than information to be transmitted to the MFP 101 from those received from each site. For example, this function deletes expired contents, file types other than designated file types, image data having file sizes equal to or larger than an upper limit, and the like.

Check function: In response to a condition check request from the MFP 101, this function checks whether or not each site is connectable based on an IP address of the MFP 101 and information transmitted from the MFP 101.

API determination function: This function compares API use counts for respective sites. For example, upon reception of an information request from the MFP 101, this function compares API use counts required to acquire that information for respective sites. Note that in this embodiment, a time-out time between the MFP 101 and relay server is decided based on the API use counts by this API determination function. The relay server 102 can notify the MFP 101 of the API use counts, and the MFP 101 decides a time-out time according to the notified API use counts.

Control function: This function distributes sites to be designated based on destination information of the MFP 101.

In this embodiment, a time-out value of the MFP 101 is set according to the respective sites. This processing will be described below. The MFP 101 determines connectable sites by executing condition check processing first.

[Condition Check]

Figure 8:
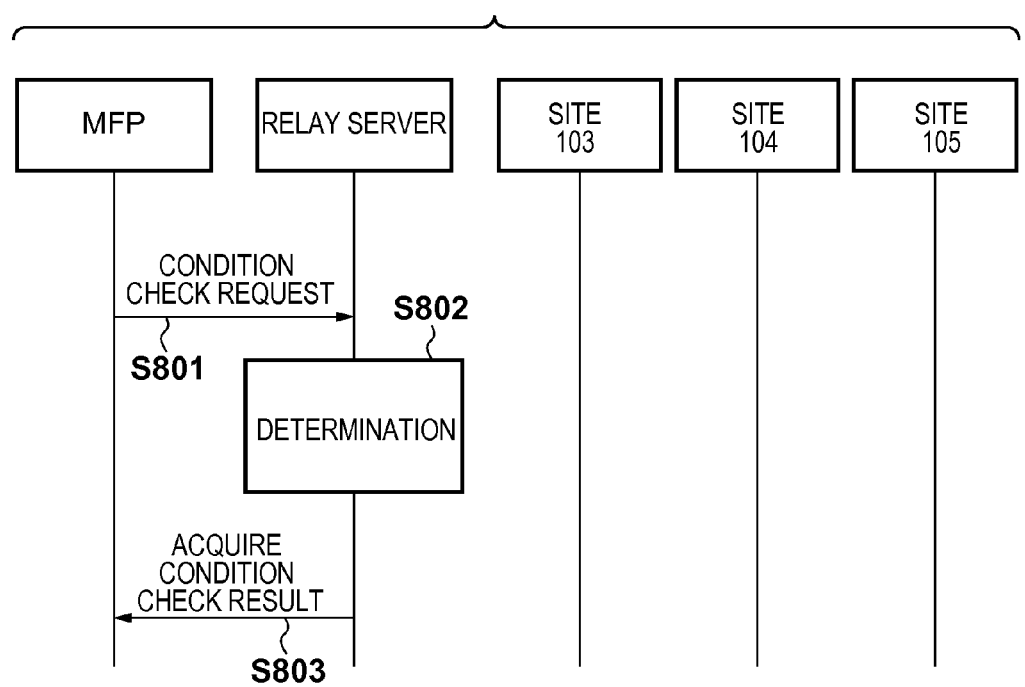
FIG. 8 is a chart showing the sequence of condition check processing.

FIG. 8 is a chart showing the sequence of condition check processing. The condition check processing is executed to determine a communication condition between the relay server 102 and designated site. The MFP 101 issues a condition check request to the relay server 102 (S801). Upon reception of the request from the MFP 101, the relay server 102 specifies a site connectable to that MFP 101 based on an IP address of the MFP 101 (S802). The relay server 102 returns a determination result by the API determination function to the MFP 101 together with the specified site (S803). The determination result by the API determination function will be described later. Upon reception of the condition check request, the relay server 102 confirms a response time from each site based on, for example, test packets, and returns it to the MFP 101. For example, when an actually measured response time is 230 msec, the relay server 102 returns that value "M" to the MFP 101. The MFP 101 saves that value "M" in a memory in the self device such as the ROM 203 as a determination value of a communication environment with that site. The following description will be given under the assumption that the three sites 103 to 105 are used as connection candidates, and it is determined that the sites 103 and 104 of these sites are connectable.

[Album List/Image List Request Example from MFP]

An outline until the MFP 101 receives an image from each site, and prints that image is as follows. The MFP 101 selects one of the available sites 103 and 104, and issues an API-R2 for authentication confirmation to the relay server 102 using an account and password required to access personal albums in that site. After that, the MFP 101 acquires an album list from the site via the relay server 102, and the user selects a desired album on the MFP 101. Then, the MFP 101 acquires an image list registered in the desired album via the relay server 102, and the user selects a desired image on the MFP 101. The MFP 101 receives the selected image from the site, and prints that image.

Figure 9:
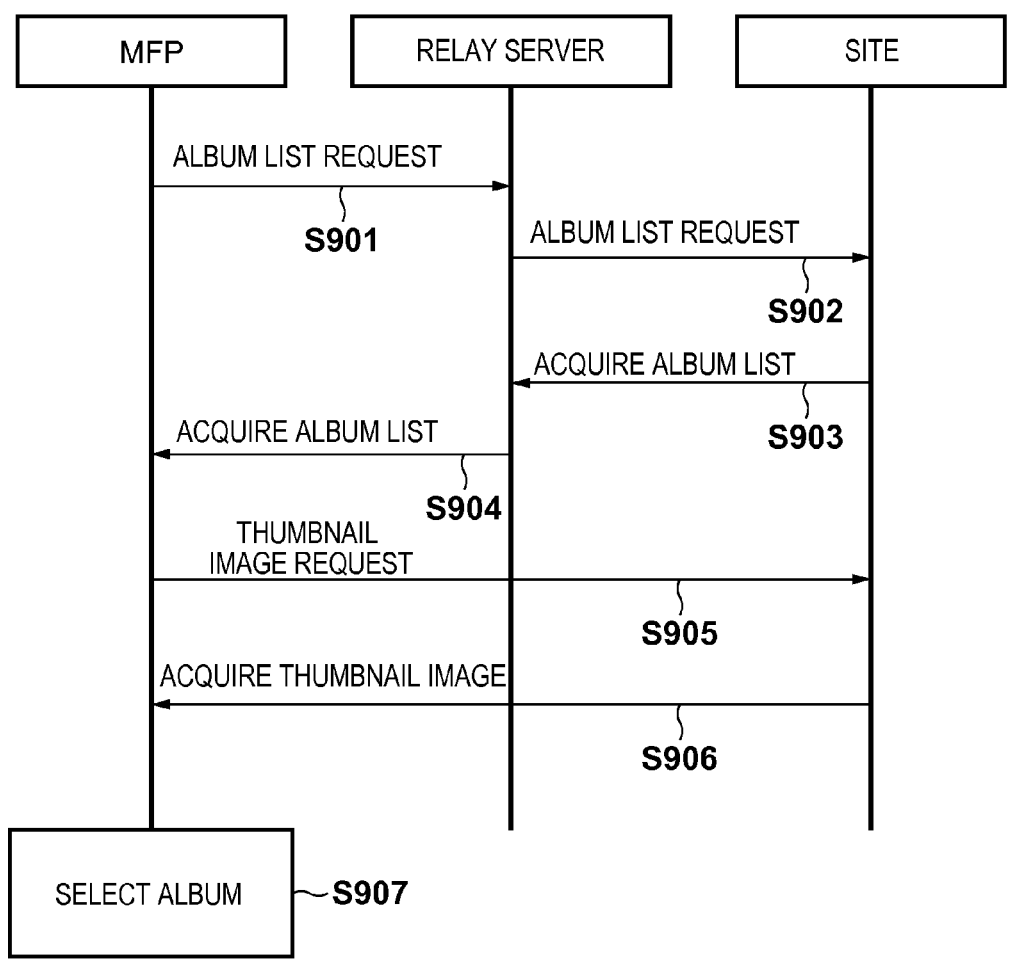
FIG. 9 is a chart showing the sequence of processing until an album list is acquired and displayed.

The sequence of the aforementioned processing will be described below with reference to FIGS. 9 and 10. FIG. 9 is a chart showing the sequence of processing until an album list is acquired and displayed. The MFP 101 issues an album list request to the relay server 102 using an API-R3 (S901). The relay server 102 interprets that request, and issues an API request according to a request destination site using the API conversion function (S902). The request destination site returns an album list to the relay server 102 in response to that request (S903). The respective sites use different API configurations in steps S902 and S903. The relay server 102 receives the album list in the description format shown in, for example, FIG. 5. The relay server 102 parses XML, and returns the album list to the MFP 101 (S904).

The MFP 101 directly issues an HTTP Get request to the site based on the received album list (S905). Then, the MFP 101 receives thumbnail images from that site (S906), and displays an album selection screen on its display screen. The user selects a desired album from the displayed album selection screen (S907). Alternatively, every time the user switches an album to be selected, the processes in steps S905 and S906 may be executed.

Figure 10:
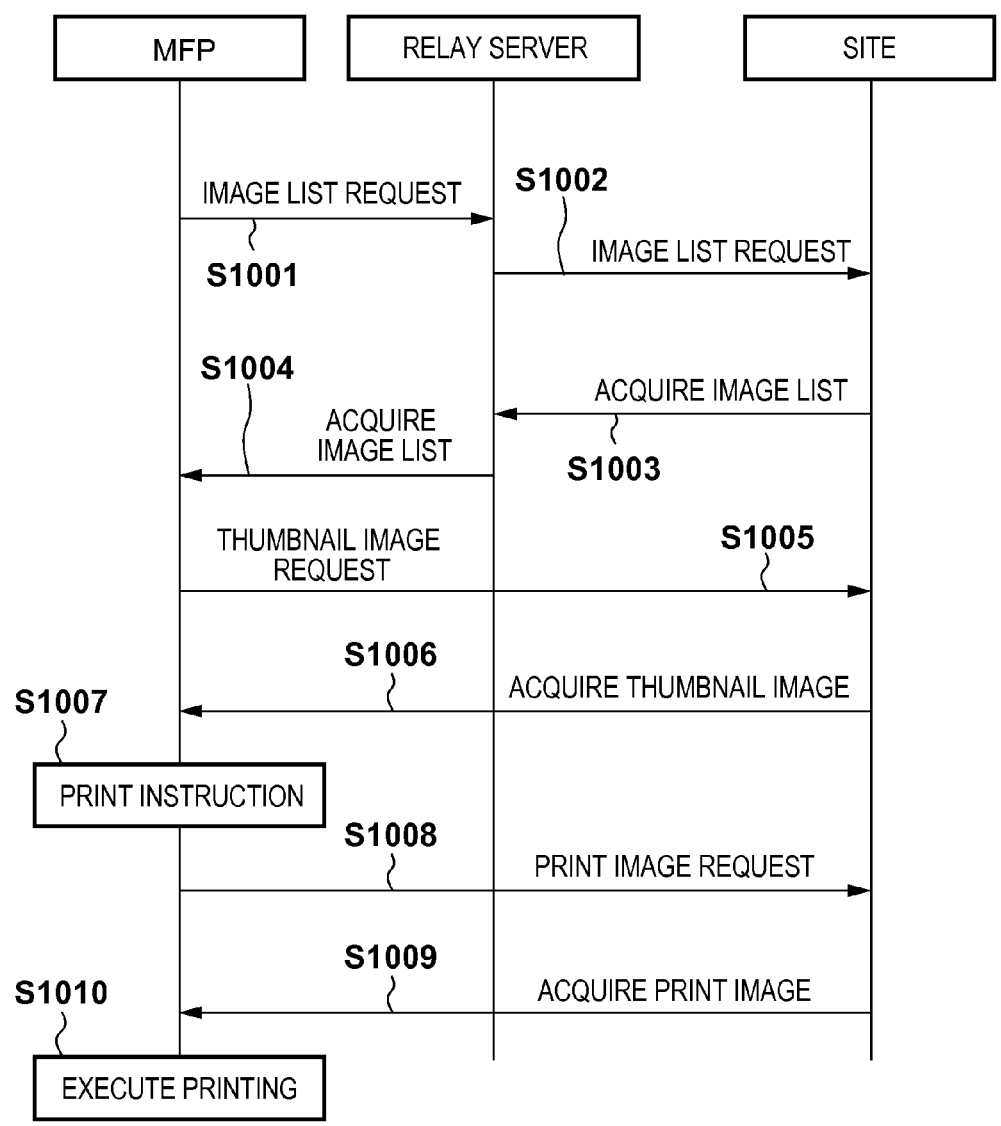
FIG. 10 is a chart showing the sequence of processing until a print target image is selected and printed.

FIG. 10 is a chart showing processing until an image to be printed is specified and printed after the processing shown in FIG. 9. The MFP 101 issues an API-R4 to the relay server 102 to request album images (S1001). The relay server 102 interprets that request to convert it into the API configuration according to the request destination site by the API conversion function, and issues the converted API to the request destination site (S1002). In response to this request, the site returns an image list of images in the designated album to the relay server 102 (S1003). The respective sites use different API configurations in steps S1002 and S1003. The relay server 102 receives an image list in the description format shown in, for example, FIG. 5. The relay server 102 parses XML, and returns the image list to the MFP 101 (S1004).

The MFP 101 acquires URL information and the like of thumbnail images from the received image list, and directly issues an HTTP Get request to the site (S1005). Then, the MFP 101 receives thumbnail images from that site (S1006), and displays an image selection screen on its display screen. The user selects a desired image from the displayed image selection screen (S1007). Alternatively, every time the user switches an image to be selected, the processes in steps S1005 and S1006 may be executed. After the user selects the desired image and inputs a print instruction, the MFP 101 directly issues an HTTP Get request to the site so as to acquire image data to be printed (S1008), and receives the image data to be printed from the site (S1009). The MFP 101 expands the received image data to be printed, and prints an image on a print medium (S1010).

[API Configurations of Respective Sites]

In the aforementioned series of processes, use counts of APIs (the numbers of API commands to be issued) issued from the relay server 102 to the respective sites so as to acquire an album list or image list are different. Based on such differences, the respective sites require different response times from when the MFP 101 issues an information request to the respective sites until it receives information. The following description will be given while taking examples.

Figure 11:
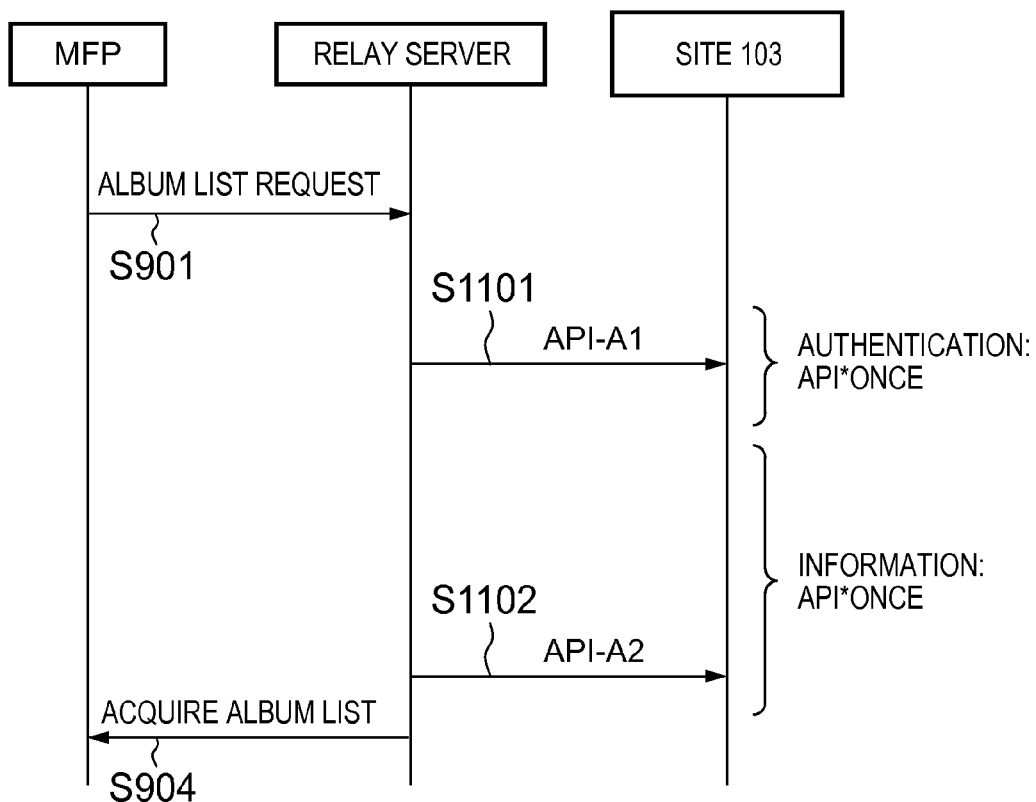
FIG. 11 is a chart for explaining an API use count for a site 103.

FIG. 11 is a chart for explaining a use count of APIs issued from the relay server 102 to the site 103 when an album list request is issued to the site 103. The relay server 102 issues an API-A1 required for authentication to the site 103 (S1101), and then issues an API-A2 required to acquire an album list (S1102). That is, the relay server 102 issues the APIs twice to the site 103 until the album list is acquired.

FIG. 12 is a chart for explaining a use count of APIs issued from the relay server 102 to the site 104 when an album list request is issued to the site 104. The relay server 102 issues an API-B1, API-B2, and API-B3 required to confirm authentication start conditions to the site 104 (S1201 to S1203). After that, the relay server 102 issues an API-B4 required for authentication (S1204). After the authentication has succeeded, the relay server 102 issues an API-B5 required to acquire an album list (S1205). Furthermore, the relay server 102 issues, to the site 104, an API-B6 required to acquire information such as titles, photographing dates, and the like for each album included in the album list (S1206). Moreover, the relay server 102 issues an API-B7 required to acquire information such as a URL of a thumbnail image as a representative image set for each album (S1207). For example, when five albums are set, as shown in FIG. 4, APIs are used five times in each of steps S1206 and S1207, and the relay server 102 issues a total of 15 API requests to the site 104.

A response time from when the MFP 101 issues a request of an album list shown in FIG. 4 until it receives the album list from the relay server 102 in accordance with the sequence shown in FIG. 11 is about 1 sec. On the other hand, a response time from when the MFP 101 issues a request of an album list shown in FIG. 4 until it receives the album list from the relay server 102 in accordance with the sequence shown in FIG. 12 is about 10 sec.

In this manner, when the user acquires the same album list from different sites, since APIs issued to the respective sites have different configurations, different response times are required. In this embodiment, a time-out value for each site is adjusted according to the aforementioned API configuration and communication conditions such as a communication time to that site upon execution of the condition check processing.

[Time-out Value Setting Method]

Figures 13, 14:
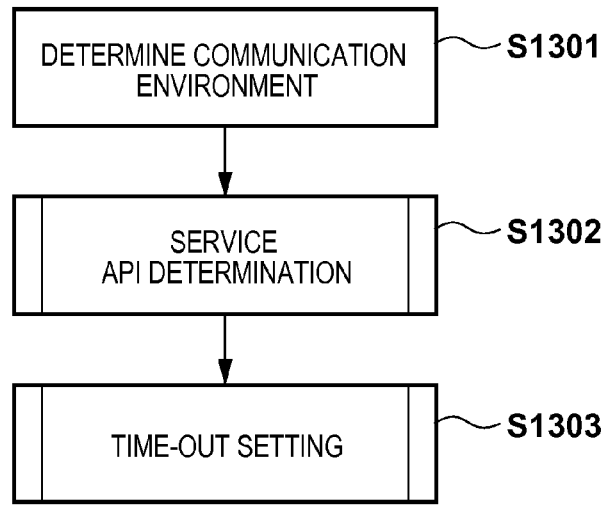
FIG. 13 is a flowchart showing the sequence of time-out value setting processing.
FIG. 14 shows an example of a determination table.

FIG. 13 is a flowchart showing the sequence of time-out value setting processing according to this embodiment. The processing shown in FIG. 13 is implemented, for example, when the CPU 200 executes a program stored in the ROM 203 using the RAM 204 as a work memory. In this embodiment, a time-out value is set using the condition check result between the MFP 101 and relay server 102. As described above, by the condition check processing of the Web servers, response times of the Web servers 103 to 105 can be respectively acquired. The condition check processing may be executed at the execution timing of the processing shown in FIG. 13, but it may be executed in advance. In this case, since an actually measured response time M as the condition check result is stored in the ROM 203, it may be read out from the ROM 203 and acquired at the decision timing of a time-out time.

As for the execution timing of the time-out time decision processing to be described using FIG. 13, the MFP 101 sets a time-out value immediately before it issues an information request for each site to the relay server 102.

The CPU 200 determines a communication environment in step S1301. In the determination process in step S1301, a determination table shown in FIG. 14 is used. The actually measured response time M obtained when the MFP 101 applies the condition check processing to the relay server 102 is compared with a reference value (for example, 200 [msec]) of a predetermined communication environment. In this embodiment, a ratio is calculated by dividing the actually measured response time M by the reference value (=200 [msec]). For example, if the value M assumes 230 [msec], a ratio="1.15" is calculated. Then, the table shown in FIG. 14 is referred to. In this example, since this ratio meets the second uppermost condition, a communication determination value "*1.1" is calculated. As will be described later, in this embodiment, a time-out time is changed according to the communication determination value acquired in step S1301.

Figure 15:
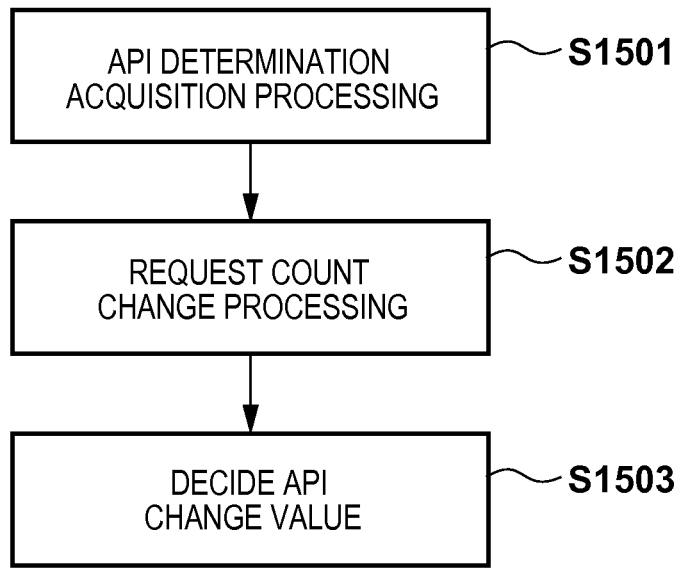
FIG. 15 is a flowchart showing the sequence of service API determination processing.

Next, the CPU 200 determines a service API in step S1302. FIG. 15 is a flowchart showing the sequence of service API determination processing. A case will be described below wherein, for example, the MFP 101 acquires an album information list including five albums and 50 images on the albums from each site.

The CPU 200 makes determination using the API determination function in step S1501. For the site 103, as shown in FIG. 11, APIs are used twice until one album list is acquired. For the site 104, APIs are used seven times (four times for authentication, and three times for data acquisition) until one album list is acquired. For the site 105, if APIs are used, as shown in, for example, FIG. 6, an API is used once until an album list is acquired. In this embodiment, an API use count ratio in each Web server is used as a determination result with reference to a minimum API use count in a plurality of Web servers until one album list is acquired. In this case, an API use count "1" in the site 105 is a minimum use count. An API use count ratio is 2 (times)/1 (time)=2 for the site 103. For the site 104, since the API-B6 and API-B7 are used once per album, the APIs are used a total of seven times per album. Therefore, an API use count ratio is 7 (times)/1 (time)=7 for the site 104, and it is 1 (time)/1 (time)=1 for the site 105. That is, AI use conditions in the plurality of sites are relatively evaluated based on the API use count ratios in the plurality of sites used by the MFP. As this ratio is higher, it is judged that a larger number of APIs and a longer time are required to acquire data. Note that as the determination result of the API determination function, a value which considers processing times and processing contents of respective APIs may be used in place of the aforementioned ratio.

Next, the CPU 200 executes request count change processing in step S1502. This processing is executed when different API use counts are required depending on an information request count in association with the API configuration of one site. That is, when the user designates a plurality of albums at the MFP 101, some sites need not always use the same numbers of APIs respectively for the plurality of albums. In such case, an API use count is calculated in consideration of the number of APIs required to acquire each album in place of simply multiplying the number of APIs required to acquire one album by the number of albums.

The site 104 will be described below. The site 104 has to call APIs three times (API-B5 to API-B7) so as to acquire album information for the first album, and has to call APIs twice (API-B6 and API-B7) so as to acquire one album information for the second or subsequent album, as shown in FIG. 6. For example, when five pieces of album information are acquired from the site 104, an API use count=2 (API-B6 and API-B7) for each of the four additional albums is added to an API use count=3 (API-B5 to API-B7) for the first album. That is, a total API use count is 11. In this embodiment, the number of APIs required to acquire second or subsequent information is used as a change value. Hence, in the site 104, the change value is "2". On the other hand, in case of the site 103, since an API use count remains the same irrespective of an information request count, a change value is "0".

In step S1503, an API change value is decided. As described above, for example, in case of the site 104, the API determination value is "7", and the change value is "2". Therefore, when an album information list including five albums and 50 images on the albums is to be acquired, the API determination value is "7", and a change value for the four additional albums is "8(=4×2)". That is, upon requesting five albums to the site 104, an API change value is decided to be "15(=7+8)".

Figure 16:
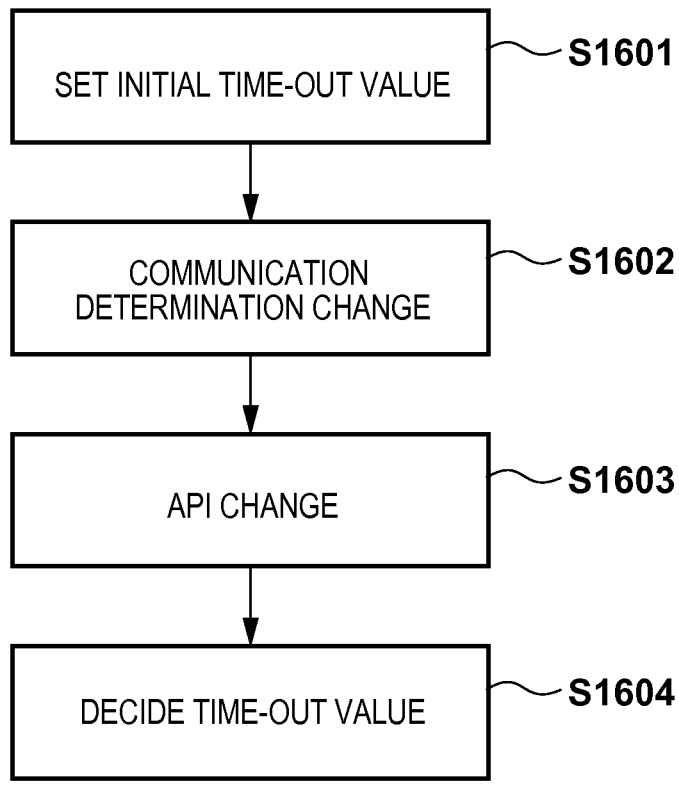
FIG. 16 is a flowchart showing the sequence of time-out value setting processing.

Referring back to FIG. 13, the CPU 200 sets a time-out value in step S1303. FIG. 16 is a flowchart showing the sequence of time-out value setting processing. In step S1601, the CPU 200 acquires a predetermined initial time-out value. In this case, the initial time-out value is, for example, "30 sec". Next, in step S1602, the CPU 200 changes the initial time-out value using the communication determination value "*1.1" obtained as a result of the determination processing in step S1301. For example, 30 sec described above are multiplied by 1.1 to be changed to 33 sec. In this way, a time-out time can be adjusted according to the actually measured response time M acquired by the aforementioned condition check processing. When an access destination Web server suffers a bad communication condition, since the actually measured response time M is prolonged, a time-out time is adjusted to be longer at this time.

Next, in step S1603, the CPU 200 further changes the time-out value using the API change value decided in step S1302. In this case, when the API change value "15" decided for the site 104 is used, 33 sec above are multiplied by the API change value "15" to yield 495 sec. Thus, a time-out time is adjusted in accordance with the number of APIs required to acquire data from the access destination Web server. That is, when the API use count is larger, the time-out time is adjusted to be longer.

In step S1604, the CPU 200 settles a connection destination site and information request count, and sets a time-out value (in this case, 495 sec) before an information request is issued to the relay server 102. This time-out value indicates a time-out time between the MFP 101 and relay server 102. For example, when data cannot be acquired from the Web server after an elapse of this set time-out time since the MFP 101 issues an information request to the relay server 102, the MFP 101 reaches a time-out.

In the aforementioned example, upon requesting five pieces of album information to the site 104, the time-out value "495 sec" is set. In this example, the initial time-out value "30 sec" is multiplied by a coefficient "1.1" associated with the actually measured response time and a coefficient "15" associated with the number of API commands according to a data size to be requested, thereby yielding "495 sec".

As described above, in this embodiment, a time-out time between the MFP 101 and relay server 102 is decided according to communication conditions required when the MFP 101 accesses the Web server via the relay server 102. As the communication condition calculation method, the actually measured response time measured in the condition check processing and the number of API commands according to a data size to be requested from the MFP 101 are used in calculations.

By setting the time-out time calculated in this way in the MFP 101 and relay server 102, a time-out is reached in an appropriate time according to an access destination of the MFP 101. For example, when the MFP 101 accesses an access destination corresponding to a short response time, and cannot acquire data from that access destination, it reaches a time-out in a shorter time than when it accesses an access destination corresponding to a long response time. Hence, a time-out is appropriately reached before the user of the MFP 101 waits for more than an enough time, and that user can make an operation required to appropriately acquire data from the access destination or another operation.

This embodiment has exemplified the time-out time calculation method which changes the initial time-out value according to the communication conditions and the number of API commands. However, the present invention is not limited to this. For example, a table which indicates time-out times each corresponding to the communication conditions and the number of API commands may be stored in the ROM 203, and a time-out value may be set according to this table. Furthermore, the aforementioned initial time-out value to be used may be pre-stored in the ROM 203 or may be designated by the user.

[Second Embodiment]

FIG. 17 is a flowchart showing the sequence of time-out value setting processing according to this embodiment. This embodiment exemplifies a case in which time-out values are set in advance in correspondence with access destinations of the MFP 101.

The CPU 200 acquires a predetermined initial time-out value in step S1701. For example, assume that the initial time-out value is "30 sec". Next, in step S1702, the CPU 200 specifies an information acquisition destination site. In this case, assume that, for example, the site 104 is specified.

The CPU 200 then refers to a table shown in FIG. 18 in step S1703 to acquire a time-out value according to the corresponding connection site. The table shown in FIG. 18 is stored in the ROM 203, and is set in advance with time-out values in consideration of API structural characteristics for respective sites. For example, a time-out value for the site 104 is set to be 600 sec. In step S1704, the CPU 200 decides the acquired time-out value "600 sec" as a time-out value, and sets the time-out value (in this case, 600 sec) before an information request is issued to the relay server 102.

In this embodiment, since time-out values are set in correspondence with access destinations of the MFP 101, a time-out time can be set by simple processing.

A time-out time for an access destination is calculated, as shown in FIG. 13, and is added to the table shown in FIG. 18. For example, when a new application is installed in the client device, a time-out time of an access destination to be accessed by that application is calculated, as shown in FIG. 13. Then, that access destination and time-out time are added to the table shown in FIG. 18. Upon accessing the newly installed application, the table shown in FIG. 18 can be used.

Note that in the aforementioned embodiments, a plurality of Web servers respectively provide Web services, and a time-out time between the MFP 101 and relay server 102 is set depending on the Web server to be accessed by the MFP 101 in correspondence with the Web service. However, the present invention is applicable to a system in which one Web server provides a plurality of Web services. That server is set with a plurality of access destinations (URLs, etc.), and provides different services from these access destinations. Even in such system, different data acquisition times are required depending on the access destinations, that is, different data acquisition times are required depending on the services used by the user. Hence, using the aforementioned embodiment, a time-out time between the client device and relay server may be set according to an access destination corresponding to a Web service used by the user of those in one server.

The aforementioned embodiments are applicable not only to the case in which the client device acquires data from the Web server via the relay server, but also to a case in which the client device transmits data to the Web server. That is, the aforementioned embodiments may be applicable to a case in which a time-out time between the client device and relay server is set when the client device uploads data to the Web server via the relay server.

When the client device uploads data to the Web server in this way, a time-out time is calculated according to the number of API commands. At this time as well, the number of API commands is calculated according to the type and data size of data to be uploaded.

Furthermore, in the aforementioned embodiments, the MFP 101 as the client device executes the processing for deciding a time-out time. However, the present invention is not limited to this, and the relay server may execute this decision processing. Moreover, in the aforementioned embodiments, the MFP has been exemplified as the client device which communicates with the Web servers. However, the present invention is not limited to such specific client device, and for example, a PC, mobile phone, or digital camera may be used.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161367, filed Jul. 22, 2011, which is hereby incorporated by reference herein in its entirety.

What is claimed is:

1. An information processing apparatus comprising:
an access unit configured to access to each of a plurality of access destinations via communication to each of the plurality of access destinations, wherein said access unit accesses to an access destination, among the plurality of access destinations, which is requested by an external device different from the plurality of access destinations;
a decision unit configured to, based on an access destination accessed by the said access unit among the plurality of access destinations, decide a time-out time corresponding to the access destination; and
a control unit configured to execute a process for causing communication between the information processing apparatus and the external device, to reach a time-out according to the time-out time decided by said decision unit, wherein communication counts for accessing to each of the plurality of access destinations by said access unit are different from each other, and
wherein said decision unit is configured to decide a first time-out time, in a case where the access unit accesses to a first access destination corresponding to a first communication count, and to decide a second time-out time which is longer than the first time-out time, in a case where the access unit accesses to a second access destination corresponding to a second communication count larger that the first communication count.

2. The apparatus according to claim 1, wherein each of the plurality of access destinations is a Web server, and said information processing apparatus is a relay server, and
wherein a communication count is a count of communication between the Web server and the relay server.

3. The apparatus according to claim 1, wherein each of the plurality of access destinations is a Web server, and a communication count is a number of API commands according to data to be communicated between said information processing apparatus and the Web server.

4. An information processing method, the method comprising:
accessing to each of a plurality of access destinations via communication to each of the plurality of access destinations, wherein an access destination, among the plurality of access destinations, which is requested by an external device different from the plurality of access destinations, is accessed in the accessing;
based on an access destination accessed by said accessing among the plurality of access destinations, deciding a time-out time corresponding to the access destination; and
executing a process for causing communication between the information processing apparatus and the external device, to reach a time-out according to the time-out time which is decided in the deciding step and corresponds to the access destination,
wherein communication counts for accessing to each of the plurality of access destinations in the accessing are different from each other, and
wherein a first time-out time is decided in the deciding, in a case where a first access destination corresponding to a first communication count is accessed in the accessing, and a second time-out time which is longer that the first time-out time, is decided in the deciding, in a case where a second access destination corresponding to a second communication count larger than the first communication count, is accessed in the accessing.

5. A computer-readable storage medium storing a program for controlling a computer, to execute to:
access to each of a plurality of access destinations via communication to each of the plurality of access destinations, wherein an access destination, among the plurality of access destinations, which is requested by an external device different from the plurality of access destinations, is accessed in the accessing;
based on an access destination accessed among the plurality of access destinations, decide a time-out time corresponding to the access destination; and
executing a process for causing communication between the information processing apparatus and the external device, to reach a time-out according to the time-out time, which is decided and corresponds to the access destination,
wherein communication counts for accessing to each of the plurality of access destinations in the accessing are different from each other, and
wherein a first time-out time is decided in the deciding, in a case where a first access destination corresponding to a first communication count is accessed in the accessing, and a second time-out time which is longer that the first time-out time, is decided in the deciding, in a case where a second access destination corresponding to a second communication count larger than the first communication count, is accessed in the accessing.

6. The apparatus according to claim 2, wherein the communication count is based on a number of API commands required when the relay server communicates with the Web server.

7. The apparatus according to claim 3, wherein the API commands includes an API command for an authentication by the Web server.

8. The apparatus according to claim 3, wherein the Web server stores images, and the API commands includes an API command for acquiring information corresponding to the images.

9. The apparatus according to claim 8, wherein the Web server stores the images so that the images are classified to albums, and the API commands includes an API command for acquiring information corresponding to the albums.

10. The apparatus according to claim 8, wherein the API commands includes an API command for acquiring the images.

11. The apparatus according to claim 1, wherein the external device is a printing device configured to print an image on a print medium.

12. The apparatus according to claim 11, wherein the printing device is configured to print an image obtained from the access destination by access by said access unit, on the print medium.

13. The apparatus according to claim 1, wherein each of the plurality of access destinations is a Web server, and the external device is configured to request and acquire data stored in each of the plurality of access destinations, via first communication between the information processing apparatus and the external device and second communication between the information processing apparatus and the Web server.

14. The apparatus according to claim 13, wherein said decision unit is configured to decide a time-out time for the first communication.

* * * * *